United States Patent [19]

Ricketts

[11] Patent Number: 5,129,363
[45] Date of Patent: Jul. 14, 1992

[54] LEASH APPARATUS

[76] Inventor: Jonathan E. Ricketts, 27 Conlin Rd., Oxford, Mass. 01040

[21] Appl. No.: 786,780

[22] Filed: Nov. 1, 1991

[51] Int. Cl.$^5$ .............................................. A01K 1/00
[52] U.S. Cl. ................................... 119/109; 119/153; 294/19.1
[58] Field of Search .................. 119/96, 109, 153, 156; 114/221 R; 441/80, 84; 222/192; 24/129 R, 136 L, 20 W

[56] References Cited

U.S. PATENT DOCUMENTS

| | | | |
|---|---|---|---|
| 643,673 | 2/1900 | Morris | 119/153 |
| 863,186 | 8/1907 | Jester | 119/153 |
| 1,478,999 | 1/1924 | Johnson | 119/153 |
| 1,850,255 | 3/1932 | Amble | 119/153 |
| 1,988,599 | 1/1935 | Lowe | 119/153 |
| 2,499,511 | 3/1950 | Koger | 119/153 |
| 2,522,454 | 9/1950 | Lewry | 119/153 |
| 2,704,052 | 3/1955 | Wood | 119/153 |
| 3,034,189 | 5/1962 | Twentier | 24/129 R |
| 4,599,074 | 7/1986 | Beckly | 119/153 X |

*Primary Examiner*—Gene Mancene
*Assistant Examiner*—Thomas Price
*Attorney, Agent, or Firm*—Hugh E. Smith

[57] ABSTRACT

An elongate coaxially aligned body includes an actuator rod reciprocatably mounted therethrough, with a handle mounted to a rear distal end of the rod exteriorly of the body, with a strap member mounted to a forward distal end of the actuator rod for sliding projection of the strap through the foward distal end of the body to permit sliding adjustment of an associated noose defined by the strap forward end mounted to the body. A modification of the invention includes the body including a flea powder compartment mounted within the body to coat the strap with flea powder and to further include a locking arrangement to latch the actuator rod within the body as required.

3 Claims, 4 Drawing Sheets

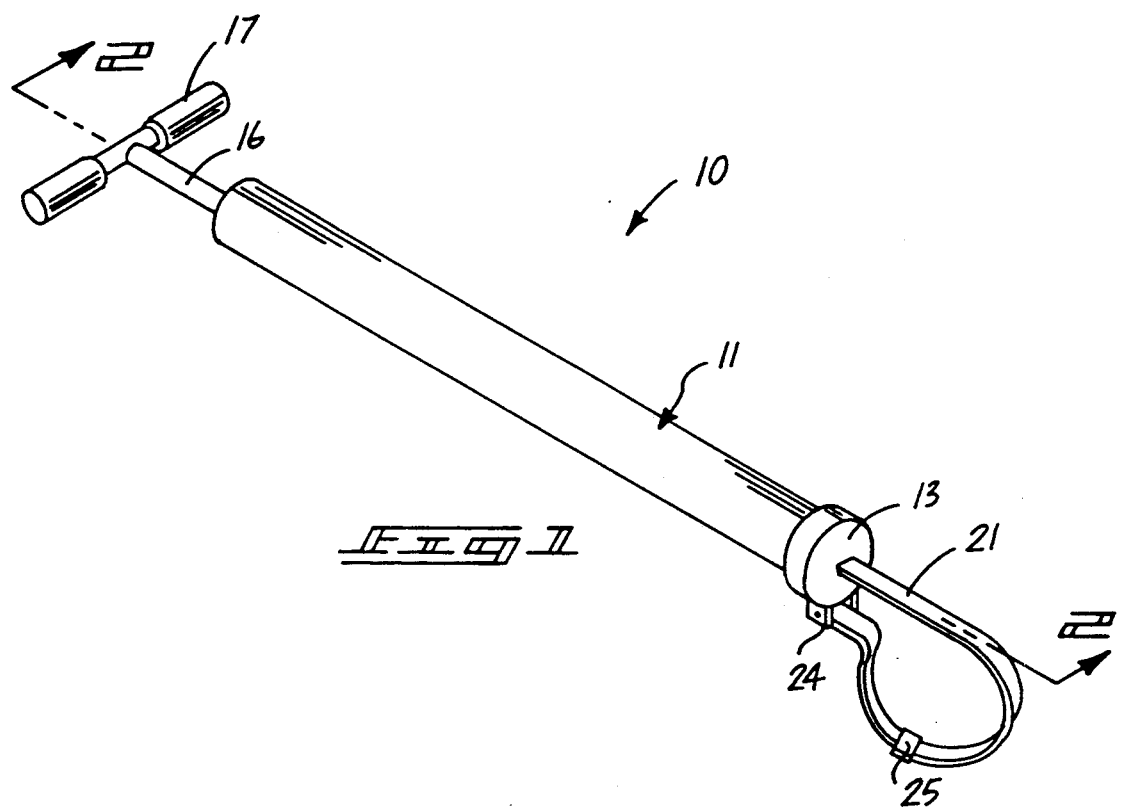

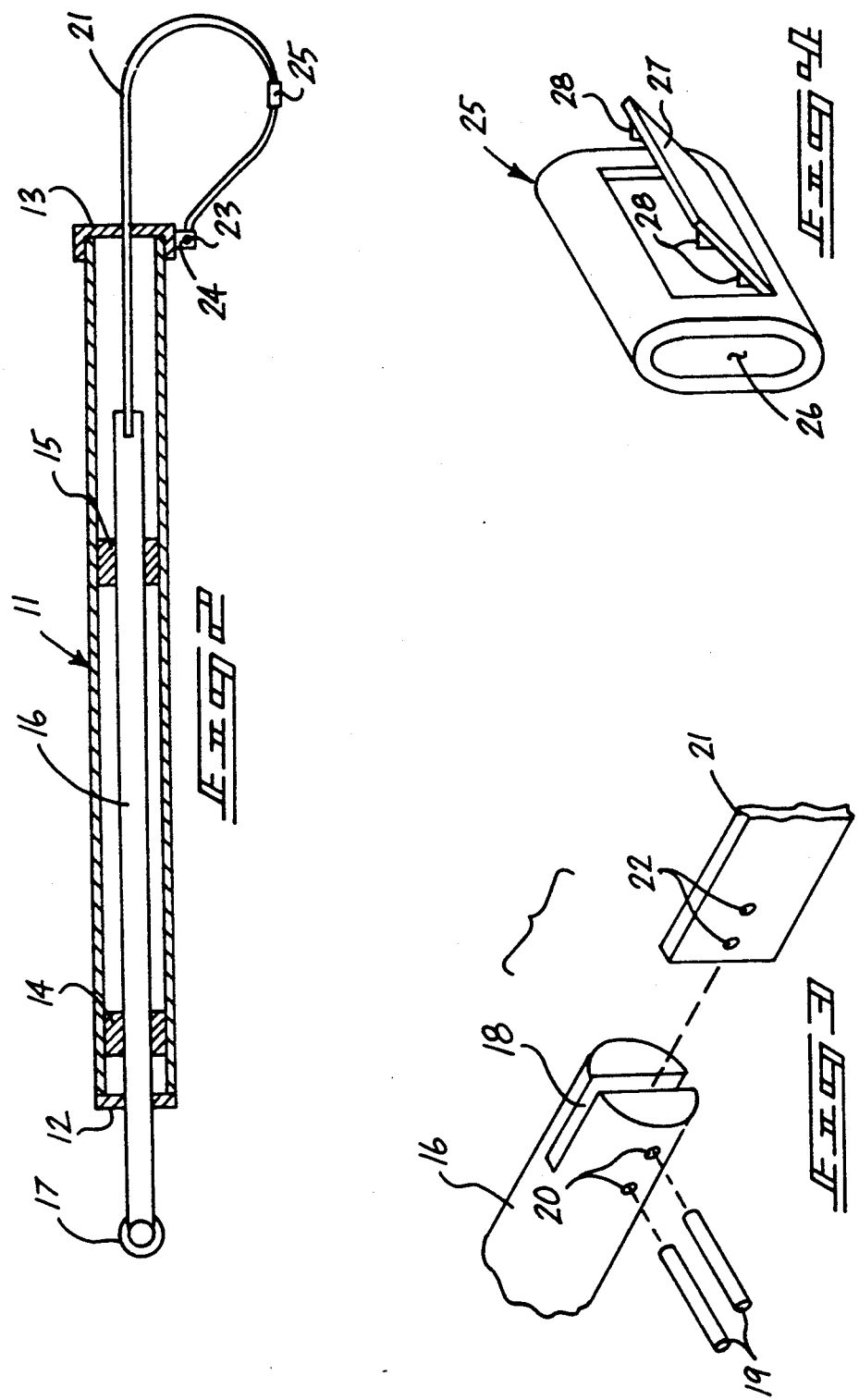

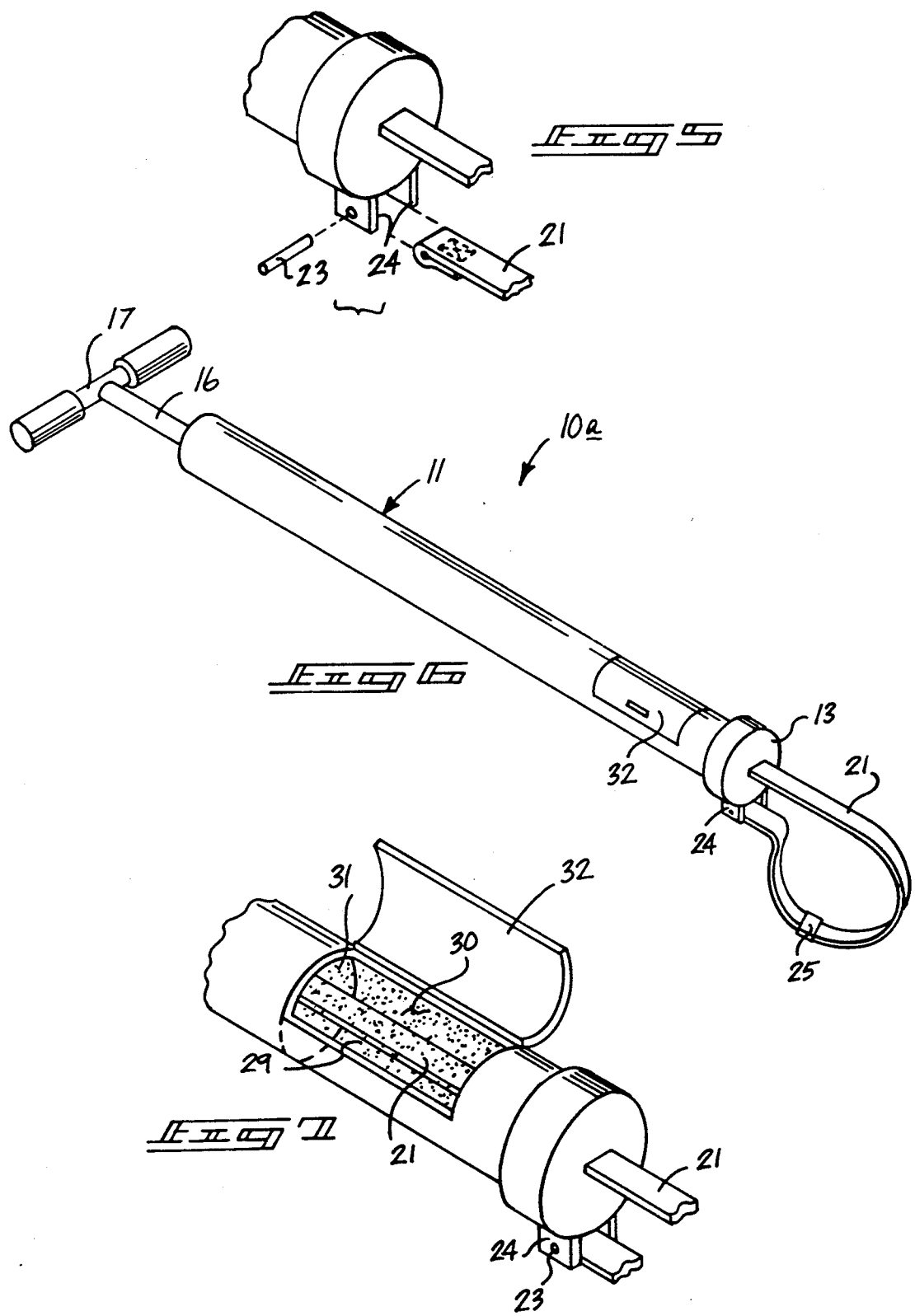

LEASH APPARATUS

BACKGROUND OF THE INVENTION

1. Field of the Invention

The field of invention relates to leash apparatus, and more particularly pertains to a new and improved leash apparatus wherein the same is arranged to provide for an adjustable noose to secure an animal therewithin.

2. Description of the Prior Art

The use of leash apparatus by many individuals, particularly individuals of diminished physical capacity, requires a great deal of effort to effect securement of the leash about an individual animal. The instant invention attempts to overcome deficiencies of the prior art by providing an elongate rigid body with a strap member adjustably directed through the body to permit ease of mounting the strap about an individual animal's head and tightening the strap for ease of securement of the strap.

Accordingly, it may be appreciated that there continues to be a need for a new and improved leash apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of leash apparatus now present in the prior art, the present invention provides a leash apparatus wherein the same permits ease of securement of a flexible tether strap about an individual animal's head. As such, the general purpose of the present invention, which will be described subsequently in greater detail, is to provide a new and improved leash apparatus which has all the advantages of the prior art leash apparatus and none of the disadvantages.

To attain this, the present invention provides an elongate coaxially aligned body including an actuator rod reciprocatably mounted therethrough, with a handle mounted to a rear distal end of the rod exteriorly of the body, with a strap member mounted to a forward distal end of the actuator rod for sliding projection of the strap through the forward distal end of the body to permit sliding adjustment of an associated noose defined by the strap forward end mounted to the body. A modification of the invention includes the body including a flea powder compartment mounted within the body to coat the strap with flea powder and to further include a locking arrangement to latch the actuator rod within the body as required.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved leash apparatus which has all the advantages of the prior art leash apparatus and none of the disadvantages.

It is another object of the present invention to provide a new and improved leash apparatus which may be easily and efficiently manufactured and marketed.

It is a further object of the present invention to provide a new and improved leash apparatus which is of a durable and reliable construction.

An even further object of the present invention is to provide a new and improved leash apparatus which is susceptible of a low cost of manufacture with regard to both materials and labor, and which accordingly is then susceptible of low prices of sale to the consuming public, thereby making such leash apparatus economically available to the buying public.

Still yet another object of the present invention is to provide a new and improved leash apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an isometric illustration of securement of the strap to the forward distal end of the actuator rod.

FIG. 4 is an isometric illustration of the abutment sheath utilized by the invention.

FIG. 5 is an isometric illustration illustrating the securement of the strap to the body.

FIG. 6 is an isometric illustration of a modification of the invention.

FIG. 7 is an isometric illustration illustrating detail of the flea powder storage compartment of the invention.

DESCRIPTION OF THE PREFERRED EMBODIMENT

Figure 8:
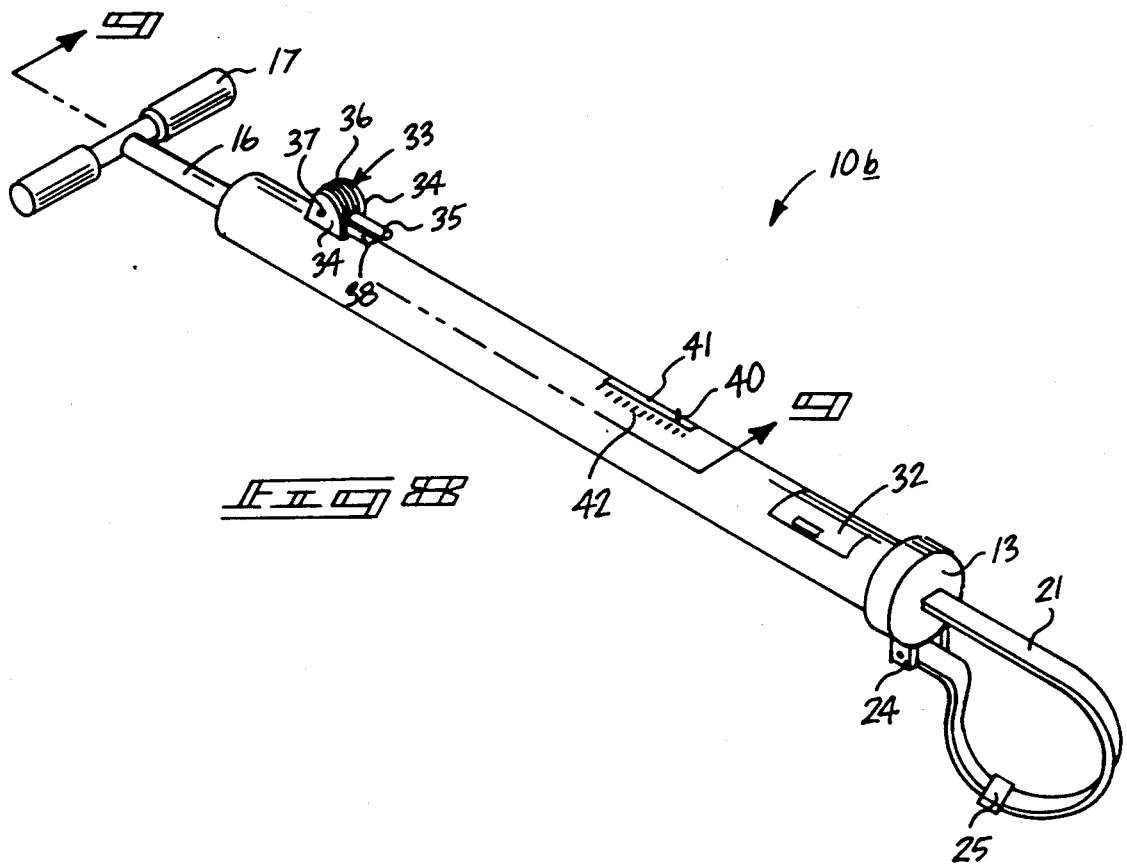
FIG. 8 is an isometric illustration of a further modified aspect of the invention.
Figure 9:
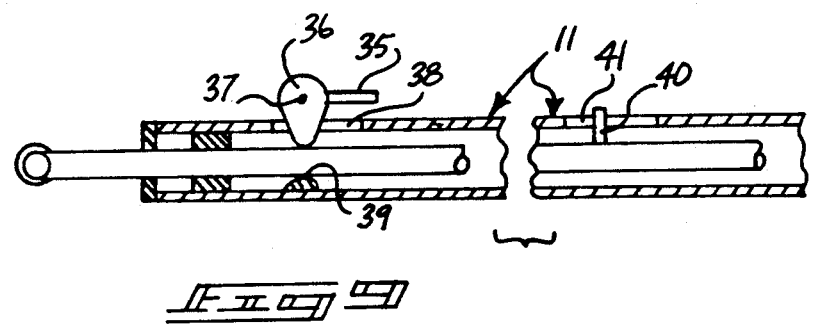
FIG. 9 is an orthographic view, taken along the lines 9—9 of FIG. 8 in the direction indicated by the arrows.

With reference now to the drawings, and in particular to FIGS. 1 to 9 thereof, a new and improved leash apparatus embodying the principles and concepts of the present invention and generally designated by the reference numerals 10, 10a, and 10b will be described.

More specifically, the leash apparatus 10 of the instant invention essentially comprises an elongate coaxially aligned body 11 defined along the single axis, wherein the body includes a body rear wall 12 orthogonally oriented relative to the axis and a body front wall orthogonally oriented to the axis, wherein the rear wall and front wall are arranged in a parallel relationship. A first guide bushing and a second guide bushing 14 and 15 respectively mounted within the body 11 are coaxially aligned and slidably receive and guide an actuator rod 16 therethrough. The actuator rod includes an actuator rod handle 17 mounted orthogonally to a rear distal end of the actuator rod 16 exteriorly of the body 11, with a forward distal end of the actuator rod including an actuator rod slot 18 coaxially aligned with the body axis. A plurality of lock pins 19 are orthogonally oriented relative to the slot and intersect the slot and received within the actuator rod forward distal end through a plurality of pin receiving bores 20 that orthogonally intersect the slot 18. A tether strap 21 is provided, wherein the tether strap includes a first end that includes a plurality of tether strap pin receiving bores 22 that when coaxially aligned within the slot 18 aligned with the bores 20 receive the lock pins 19 through the pin receiving bores 20 and the tether strip pin receiving bores 22. A second distal end of the strap 21 includes a pivot axle 23 mounted within a loop formed at the strap second end, wherein the strap second end is positioned between spaced support flanges 24 and wherein the pivot axle 23 is orthogonally directed through the support flanges 24 and through the strap second end, as illustrated in the FIG. 5 for example.

An abutment sheath 25 is provided to limit projection of the strap 21 within the body 11 that includes a strap receiving bore 26 directed therethrough, and further includes a sheath latch plate 27 hingedly mounted to the sheath 25, wherein the sheath latch plate 27 includes a plurality of latch plate teeth 28 fixedly mounted to an interior surface of the latch plate 27 in confrontation with the strap receiving bore 26 to engage the strap directed through the strap receiving bore 26 for latching of the sheath 25 to the strap 21.

A modified apparatus 10a includes a flea powder receiving chamber 30 to receive flea powder 29 therewithin. The chamber 30 positioned between the body front wall 13 and a chamber rear wall 31 that is arranged in a spaced parallel relationship relative to the body front wall 13. A door plate 32 directed through the body between the rear wall 31 and the body front wall 13 provides access to the chamber 30 for replenishment of flea powder within the chamber.

A further modified apparatus 10b illustrates the use in association with the aforenoted apparatus 10 and 10a a cam lock 33 provided adjacent the body rear wall 12, wherein the cam lock 33 includes a plurality of spaced support plates 34 fixedly mounted to an exterior surface of the body 11 on opposed sides of a cam receiving slot 38 that is arranged in a parallel relationship relative to the body axis. A cam axle 37 orthogonally directed through the support plates 34 is fixedly mounted to a cam 36 pivotally mounted between the support plates 34. A handle shaft 35 mounted to the cam 36 permits selective rotation of the cam, wherein projection of the cam axle 37 through the slot 38 into abutment with the actuator rod 16 cooperates with an abutment boss 39 mounted in a diametrically opposed relationship relative to the cam 36 to frictionally engage the actuator rod 16 to thereby latch the actuator rod in a fixed positioned within the body 11.

To provide indication of positioning of the actuator rod 16 within the body 11, an indicator rod 40 is mounted fixedly to the actuator rod in an orthogonal relationship relative to an actuator rod axis, wherein the indicator rod 40 projects radially relative to the actuator rod and projects through an indicator slot 41 directed through the body 11 in a spaced relationship relative to the cam receiving slot 38. Gradations 42 positioned on the body adjacent the slot are provided to enable visual observation of the orientation of the actuator rod 16 within the body 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A leash apparatus, comprising,
an elongate coaxially aligned body defined along a body axis, wherein the body includes a rear wall mounted to a rear distal end of the body and a front wall mounted to the forward distal end of the body, wherein the rear wall and front wall are arranged in a parallel relationship, and
the body includes at least one guide bushing mounted within the body, the guide bushing slidably receiving an actuator rod therethrough, the actuator rod including a rod forward distal end and a rod rear distal end, the rod rear distal end including a rod handle orthogonally mounted to the rod rear distal end, and the rod forward distal end including a rod slot, the slot coaxially aligned with the body axis, and a tether strap, the tether strap including a first end fixedly secured within the rod slot, and including a tether strap second end, wherein the tether strap second end is pivotally mounted to the elongate body, and wherein the tether strap defines a loop between the body and the body front wall, and the tether strap second end includes a loop, and the body includes a plurality of support flanges, and a tether strap pivot axle directed orthogonally through the support flanges and through the tether strap second end, and the slot includes at least one orthogonally intersecting pin receiving bore, and the strap first end includes at least one strap receiving bore, and the strap receiving bore and the pin receiving bore are coaxially aligned when the strap second end is positioned within the slot, and including a lock pin directed through the strap receiving bore and the pin receiving bore, and an abutment sheath selectively mounted along the tether strap, wherein the sheath includes a strap receiving conduit directed longitudinally therethrough, and further includes a sheath latch plate pivotally mounted to the sheath, wherein the sheath latch plate includes a plurality of latch plate teeth fixedly mounted to an interior surface of the latch plate in confrontation with the strap receiving conduit, whereupon projection of the latch plate into the strap receiving conduit effects engagement of the teeth with the strap to secure the sheath along the strap, and a flea powder receiving chamber within the elongate body, wherein the flea powder receiving chamber is defined between the elongate body front wall and a chamber rear wall spaced from and parallel the body front wall, and a door plate pivotally mounted to the elongate body between the chamber rear wall and the body front wall, and including a predetermined quantity of flea powder positioned within the chamber to impart the flea powder onto the strap within the chamber.

2. An apparatus as set forth in claim 1 further including a cam lock, the cam lock including a plurality of spaced support plates fixedly mounted to the elongate body projecting exteriorly of the elongate body, with a cam axle pivotally mounted between the support plates, and a cam fixedly mounted to the cam axle, and a handle shaft mounted to the cam for effecting pivotment of the cam, and a cam receiving slot directed through the elongate body between the spaced support plates for receiving the cam therethrough into abutting communication with the actuator rod, and a cam cooperating abutment boss fixedly mounted within the cam body in a diametrically opposed relationship relative to the cam for arresting movement of the actuator rod by arresting the actuator rod between the abutment boss and the cam.

3. An apparatus as set forth in claim 2 further including an indicator rod fixedly mounted to the actuator rod extending radially thereof, and an indicator rod slot directed through the elongate body spaced from the cam receiving slot, wherein the indicator rod slot and the cam receiving slot are arranged in a parallel relationship relative to the body axis, and the indicator rod projects through the indicator rod slot for visual indication of positioning of the actuator within the elongate body.

* * * * *